(12) United States Patent
Peng

(10) Patent No.: US 12,220,012 B2
(45) Date of Patent: Feb. 11, 2025

(54) SMART MASK SYSTEM

(71) Applicant: Shenzhen Efercro Electronic Technology Co., Ltd, Guangdong (CN)

(72) Inventor: Suting Peng, Guangdong (CN)

(73) Assignee: Shenzhen Efercro Electronic Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/458,440

(22) Filed: Aug. 30, 2023

(65) Prior Publication Data

US 2024/0315370 A1 Sep. 26, 2024

(30) Foreign Application Priority Data

Mar. 20, 2023 (CN) .......................... 202320541461.4

(51) Int. Cl.
  *A41G 7/02* (2006.01)
  *G06F 3/147* (2006.01)

(52) U.S. Cl.
  CPC .............. *A41G 7/02* (2013.01); *G06F 3/147* (2013.01)

(58) Field of Classification Search
  CPC ................................ A41G 7/02; G06F 3/147
  USPC ....................................................... 345/156
  See application file for complete search history.

(56) References Cited

U.S. PATENT DOCUMENTS

| | | | |
|---|---|---|---|
| 6,662,376 B2 | 12/2003 | Cook | |
| 6,671,886 B1 | 1/2004 | Reitz | |
| 2016/0029716 A1* | 2/2016 | Duncan | A41D 13/11 |
| | | | 128/863 |
| 2016/0041581 A1* | 2/2016 | Piccionelli | G02F 1/133305 |
| | | | 345/156 |
| 2017/0209309 A1 | 7/2017 | Lazor | |
| 2017/0262134 A1* | 9/2017 | Eriksson | G06F 3/041 |
| 2018/0000179 A1* | 1/2018 | Simon | A41G 7/02 |
| 2018/0124930 A1* | 5/2018 | Sisson | E06B 5/006 |
| 2019/0045862 A1 | 2/2019 | Parrish | |
| 2019/0089533 A1* | 3/2019 | Agnello | H04L 63/0846 |
| 2020/0306122 A1* | 10/2020 | Kershaw | G16H 40/63 |
| 2021/0173227 A1* | 6/2021 | Kershaw | A61H 1/00 |
| 2021/0244109 A1* | 8/2021 | Nishida | A62B 18/02 |
| 2022/0113922 A1* | 4/2022 | Feng | G06F 3/147 |
| 2022/0147972 A1* | 5/2022 | Dershem | G06Q 20/3278 |
| 2023/0090457 A1* | 3/2023 | Liu | G06T 13/40 |
| | | | 345/419 |

* cited by examiner

*Primary Examiner* — Tom V Sheng

(57) ABSTRACT

Provided is a smart mask system, including: an electronic mask, configured to use an electronic display technology to display images; an electronic device, interconnected with the electronic mask and performing data interaction with the electronic mask; and a server, interconnected with the electronic device and performing data interaction with the electronic device. The electronic device is installed with an application program, and interaction between the electronic device and the electronic mask or the server is realized through the application program.

18 Claims, 4 Drawing Sheets

SMART MASK SYSTEM

TECHNICAL FIELD

The present disclosure relates to a smart mask system.

BACKGROUND

Masks are widely applied. In the entertainment application, existing masks generally use a color printing or spraying manner to form patterns such as facial makeup, figures and characters on the surfaces of the masks. A user needs to choose different masks according to different scenarios, and also needs to change different masks according to the situation transformation. The reason is that in the masks with the traditional structures, each mask only can display one pattern which only can be displayed statically.

For the above shortcomings, an electronic mask is a better solution. The existing electronic mask uses an electronic display screen to display pattern information, and can change the displayed images optionally, thereby solving the shortcomings of the above traditional masks. The existing electronic mask can receive image data of an external electronic device, and store the image data into a memory of the electronic mask. However, the electronic mask is limited to sending data to the electronic device. For example, the image data stored by the electronic mask cannot be shared with the electronic device, and the state information of the electronic mask cannot be displayed on the electronic device. Secondly, the electronic devices are independent of each other, and the image data of the electronic masks stored in the electronic devices cannot be shared or cannot be rapidly shared. In addition, in most cases, the electronic device is only configured to send image data to the electronic mask, and the interaction ability between the electronic device and the electronic mask or a server is limited.

SUMMARY

An objective of the present disclosure is to provide a smart mask system to overcome all or some of the shortcomings in the prior art.

To achieve the above objective, the present disclosure provides the following technical solution:

a smart mask system includes:
an electronic mask, configured to use an electronic display technology to display images;
an electronic device, interconnected with the electronic mask and performing data interaction with the electronic mask; and
a server, interconnected with the electronic device and performing data interaction with the electronic device,
where the electronic device is installed with an application program, and interaction between the electronic device and the electronic mask or the server is realized through the application program.

In some embodiments, the electronic mask includes:
a display screen; and
a drive circuit, electrically connected to the display screen, configured to drive a display area of the display screen, and including a processor, and a storage module, a first communication module and a power supply module which are electrically connected to the processor,
where
the storage module is configured to store image data displayed by the display module; and
the first communication module is configured to establish a communication connection with the electronic device.

In some embodiments, the electronic mask includes a circuit board, the display screen is arranged on a first surface of the circuit board, and the drive circuit is arranged on a second surface of the circuit board.

In some embodiments, the electronic mask includes a shell, the circuit board is arranged in the shell and is supported by the shell, and the shell is reserved with a window for the display screen to display images.

In some embodiments, a panel with light-transmitting property is arranged in the shell; and the panel is mounted on one side, for displaying images, of the display screen, and is configured to shield the display screen, such that the structure of the display screen cannot be seen or seen clearly through the panel, and the intensity of light of the display screen passing through the panel is weakened.

In some embodiments, the shell is provided with a rope-passing hole for mounting a fastening rope, such that a user can fix the electronic mask on the head through the fastening rope.

In some embodiments, an isolating pad is arranged on one side, close to a human face, of the shell; and the isolating pad allows for a certain distance between the face and the shell.

In some embodiments, a decorating part with a light-emitting function is arranged on the shell, and is electrically connected to the processor.

In some embodiments, the electronic mask further includes a sensor module.

The sensor module is electrically connected to the processor, and is configured to monitor an image and/or sound information outside the electronic mask and send the information to the processor to cause the electronic mask to make a corresponding response according to the information.

In some embodiments, the electronic mask further includes a button module, and the button module is electrically connected to the processor.

In some embodiments, the electronic device is provided with a second communication module, and is connected to the electronic mask and the server through the second communication module.

In some embodiments, the interaction between the electronic device and the electronic mask includes:
receiving, by the electronic mask, image data uploaded by the electronic device and storing the image data into the storage module in response to an image data uploading instruction sent by the electronic device.

In some embodiments, the interaction between the electronic device and the electronic mask includes:
sending, by the electronic mask, the image data stored in the storage module to the electronic device in response to a download request instruction sent by the electronic device.

In some embodiments, the interaction between the electronic device and the electronic mask includes:
executing, by the electronic mask, a working state corresponding to a control instruction in response to the control instruction sent by the electronic device.

In some embodiments, the interaction between the electronic device and the electronic mask includes:
receiving, by the electronic device, information data sent by the electronic mask, and displaying the information data by the application program.

In some embodiments, the interaction between the electronic device and the electronic mask includes:

executing, by the electronic device, an operation corresponding to an instruction in response to the instruction sent by the electronic mask.

In some embodiments, through the application program, an image content displayed by the electronic mask is edited.

In some embodiments, through the application program, image data of the server can be browsed and/or managed, and the image data is downloaded optionally; or through the application program, the Internet can be connected to, and image data is searched and downloaded.

In some embodiments, the server is configured to store image data capable of being displayed by the electronic mask and respond to a request sent by the electronic device.

In some embodiments, the server, in response to a browsing request of the electronic device, loads image information displayed by the electronic mask, and sends the image information to the electronic device, where the image information is sequenced according to a download frequency, and high-frequency image information is sent to the electronic device.

Compared with the prior art, the present disclosure has the following advantages:

the electronic device of the present disclosure can achieve data interaction with the electronic mask and the server, and the electronic mask can share the image data in the storage module of the electronic mask; the electronic device acquires the state information, such as electric quantity information, of the electronic mask; the electronic device can control the working state of the electronic mask, for example, the on and off of a decorating part (corner lamp); the electronic device can control the display content and the actual state of the electronic mask; the electronic device can edit the image content displayed by the electronic mask; and in addition, the server can perform sequencing according to the download frequency of the image data and send the image data with higher frequency to the electronic device first so as to optimize the use experience of users.

BRIEF DESCRIPTION OF THE DRAWINGS

The drawings of the specification that constitutes a part of the present application are used to provide a further understanding of the present disclosure. The exemplary embodiments of the present disclosure and the description thereof are used to explain the present disclosure, and do not constitute an improper limitation of the present disclosure. In the drawings.

DETAILED DESCRIPTION OF THE EMBODIMENTS

Figure 1:
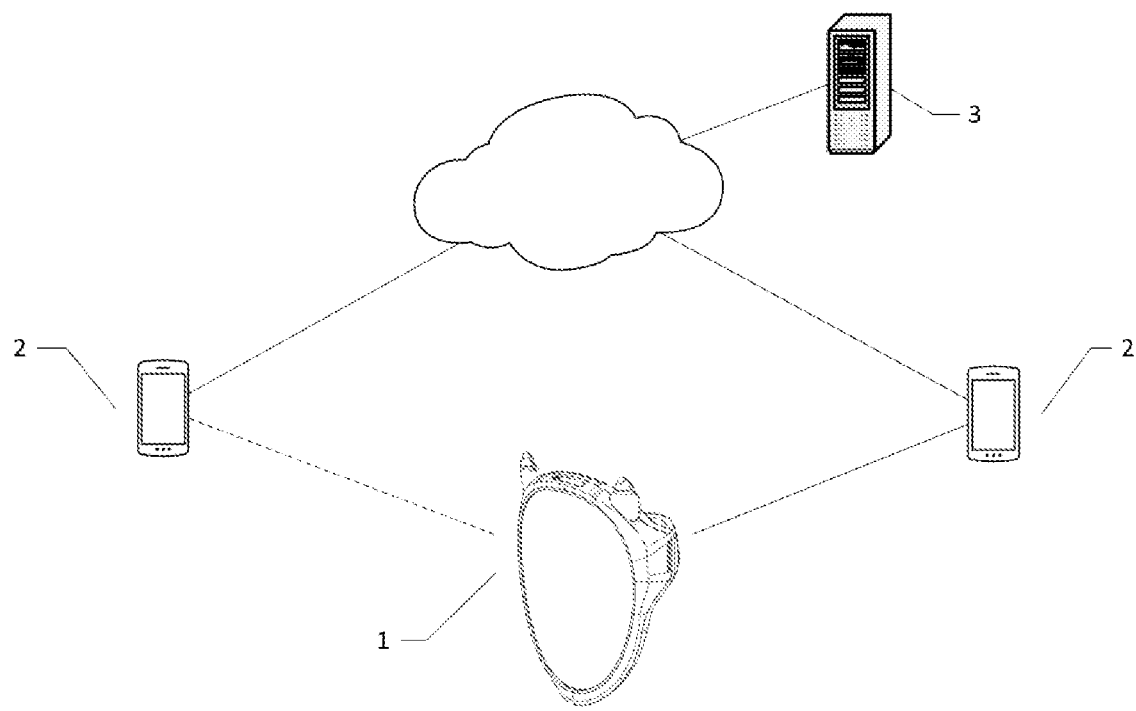
FIG. 1 is a schematic structural diagram of a smart mask system.
Figure 2:
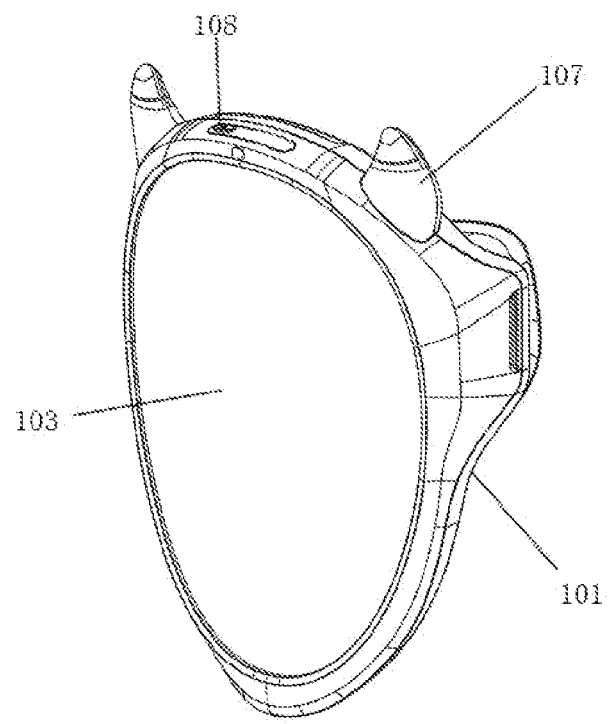
FIG. 2 is a schematic structural diagram of a first surface of an electronic mask.
Figure 3:
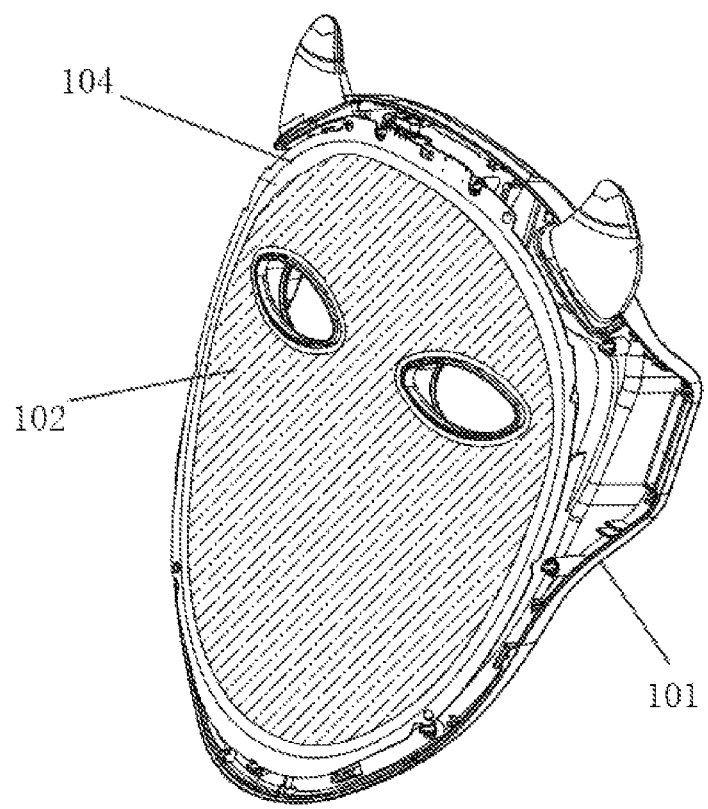
FIG. 3 is a mounting schematic diagram of a circuit board.
Figure 4:
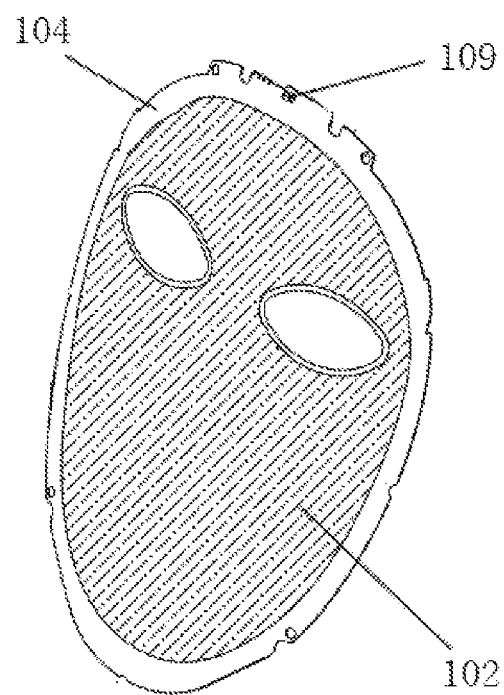
FIG. 4 is a schematic structural diagram of a first surface of a circuit board.
Figure 5:
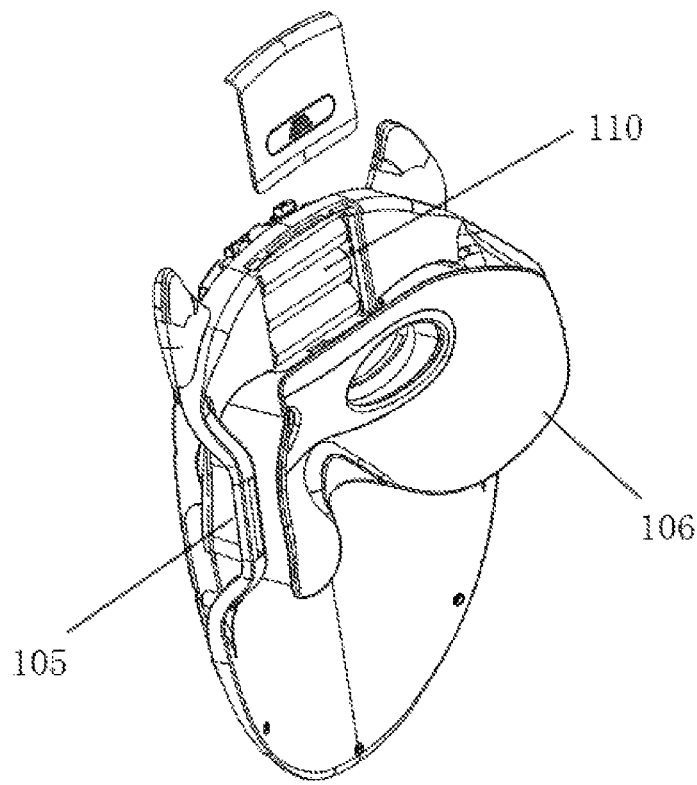
FIG. 5 is a schematic structural diagram of a second surface of an electronic mask.
Figure 6:
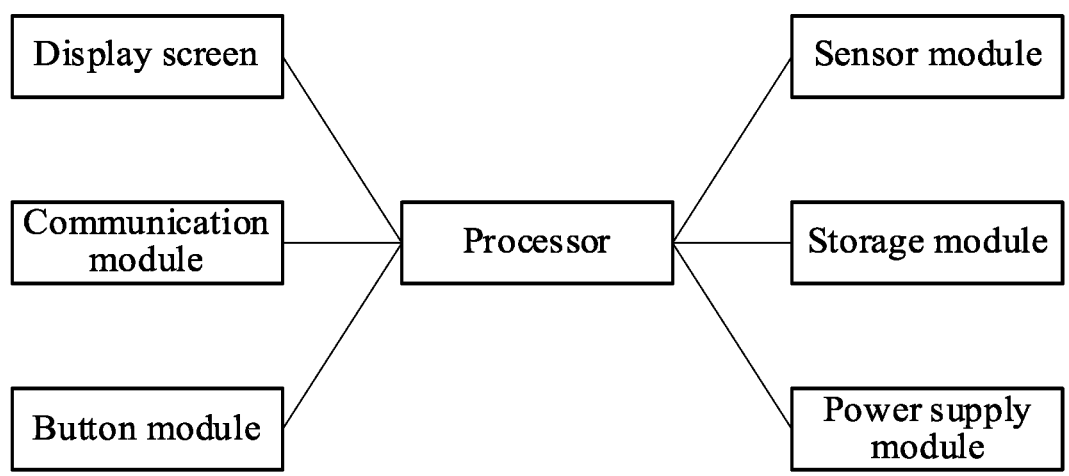
FIG. 6 is a structural block diagram of an electronic mask.

The present disclosure will be described in detail below with reference to the accompanying drawings and in conjunction with embodiments. Various examples are provided by way of interpretation of the present disclosure and are not intended to limit the present disclosure. Indeed, it will be apparent to those skilled in the art that modifications and variations may be made in the present disclosure without departing from the scope or spirit of the present disclosure. For example, features shown or described as part of one embodiment may be used in another embodiment to produce yet another embodiment. It is therefore desirable that the present disclosure encompass such modifications and variations falling within the scope of the appended claims and their equivalents.

In the description of the present disclosure, the terms "longitudinal", "transverse", "up", "down", "front", "back", "left", "right", "vertical", "horizontal", "top", "bottom" and the like denote orientation or positional relationships based on those shown in the drawings and are intended for ease of description only and not to require that the present disclosure is necessarily constructed and operated in a particular orientation and therefore cannot be construed as limiting to the present disclosure. The terms "joint", "connect" and "set" used in the present disclosure should be understood in a broad sense, for example, which may refer to a fixed connection or a detachable connection; which may refer to a direct connection or an indirect connection through intermediate components; which may refer to a wired electrical connection, a radio connection, or a wireless communication signal connection, and the specific meanings of the above terms may be understood by those of ordinary skill in the art according to a specific situation.

One or more examples of the present disclosure are shown in the accompanying drawings. The detailed description uses numeric and letter marks to refer to features in the drawings. Similar or like reference signs in the drawings and descriptions have been used to refer to similar or like parts of the present disclosure. As used herein, the terms "first", "second" and "third" and the like are used interchangeably to distinguish one member from another and are not intended to denote the location or importance of individual members.

As shown in FIG. 1, according to the embodiments of the present disclosure, a smart mask system is provided, and includes an electronic mask 1, an electronic device 2 and a server 3.

As shown in FIG. 2 to FIG. 6, the electronic mask 1 includes a display screen 102. The electronic display technology of the display screen 102 includes a thin film transistor (TFT), an organic thin film transistor (OTFT), a light-emitting diode (LED), an organic light-emitting diode (OLED), an active matrix OLED (AMOLED), electronic paper (e-paper) manufactured by a self-aligned imprint lithography (SAIL) process and the like, which is not limited herein. The display screen 102 is provided with a first open hole matched with eyes, and a user can observe the surrounding environment through the open hole.

The electronic mask 1 further includes a storage module, and the storage module is configured to store image data capable of being displayed by the electronic mask 1. The image data includes but is not limited to picture data, text data and image data. The picture data includes picture formats capable of being displayed by the electronic mask 1, including but not limited to PNG, JPG, TIF, GIF and the like.

The electronic mask 1 is further provided with a first communication module, and the first communication module is applied to data transmission between the electronic mask 1 and the electronic device 2. Generally, the first communication module uses a wireless transmission technology to realize the connection between the electronic mask 1 and the electronic device 2. In this embodiment, image data is transmitted between the electronic mask 1 and the electronic device 2 by a Bluetooth technology.

The electronic mask 1 further includes a power supply module, and the power supply module provides power supply for the electronic mask 1. The power supply module includes a power supply circuit and a common dry battery or rechargeable battery 110. In the embodiments provided below, the shell described below is provided with a battery compartment for accommodating the battery. In some embodiments, a charging circuit is further included, and the charging circuit is provided with a charging interface, such as a USB interface 108.

Specifically, in this embodiment, the electronic mask 1 includes a circuit board 104, the circuit board 104 is provided with a second open hole matched with the first open hole of the display screen 102, and the display screen 102 is arranged on a first surface of the circuit board 104. A second surface of the circuit board 104 is provided with a drive circuit. The drive circuit includes a processor, and a storage module, a first communication module and a power supply module which are electrically connected to the processor.

The electronic mask 1 further includes a shell 101, and the circuit board 104 is mounted on the shell 101. The shell 101 is further provided with a panel 103. The panel 103 has a certain light-transmitting property, is mounted on the display screen 102, and can completely shield the display screen 102. The light-transmitting property refers to: when the display screen 102 is in an off state, the panel 103 can shield the structure of an electronic apparatus on the display screen 102, such that the structure of the display screen 102 cannot be seen clearly or seen through the panel 103; and when the display screen 102 is in an on state, the display screen 102 can display an image through the panel 103, but light of the display screen 102 is partially weakened, thereby avoiding the discomfort caused by strong light to eyes of viewers.

The shell 101 is provided with a rope-passing hole 105 for mounting a fastening rope, such that a user can fix the electronic mask 1 on the head through the fastening rope.

In some embodiments, an isolating pad 106 is arranged on one side, close to a human face, of the shell 101; and the isolating pad 106 can set a certain distance between the face and the shell 101, thereby avoiding direct contact between the shell 101 and the face. The isolating pad is made of a soft colloidal material, preferably, can choose a high-quality skin-friendly colloidal material.

In some embodiments, the shell 101 is provided with a decorating part with a light-emitting function, a light-emitting part is arranged in the decorating part, the light-emitting part is electrically connected to the drive circuit, and the light-emitting state of the light-emitting part is controlled by the drive circuit. In this embodiment, the decorating part includes two corner lamps 107 arranged at the top of the shell 101.

In some embodiments, the electronic mask 1 further includes a sensor module, the sensor module is electrically connected to the drive circuit, and the sensor module is configured to monitor image and/or sound information outside the electronic mask and send the monitored information to the processor, such that the electronic mask makes corresponding response according to the monitored information. The monitored information includes but is not limited to: an infrared gesture sensor 109, capable of acquiring gesture information; an image sensor, capable of acquiring external image information; and a sound sensor, capable of acquiring external sound information. The gesture information includes but is not limited to a shape, a movement trajectory and a movement speed of a gesture; the image information includes but is not limited to a content and a movement trajectory of an image; and the sound information includes but is not limited to a content, a volume and an orientation of sound. In some embodiments, the electronic mask 1 makes the corresponding response according to the information monitored by the sensor. For example, the electronic mask 1 switches the displayed images according to the gesture information. In some embodiments, the electronic mask 1 can send the information monitored by the sensor module to the electronic device 2 through the first communication module, and the electronic device 2 performs the corresponding response according to the gesture information. For example, the gesture information captured by the infrared gesture sensor 109 can be sent to the electronic device 2, and the electronic device 2 can perform the corresponding response according to preset gesture information.

In some embodiments, the electronic mask 1 further includes a button module. A corresponding instruction is sent to the electronic mask 1 by the button module, such that the electronic mask 1 performs the corresponding response according to the corresponding instruction. For example, the button module includes a plurality of tactile buttons or touch buttons, where some buttons are configured to control the image switching of the electronic mask 1. In a case that the button for image switching is triggered, the electronic mask 1 responds to image switching according to a preset instruction. In some embodiments, the button module is arranged on the shell 101, for example, on two sides of the shell 101.

The electronic device 2 of the present application includes a smart phone, a tablet personal computer, a laptop computer or a desktop computer.

The electronic device 2 is provided with a second communication module, such that the electronic device is optionally connected to the electronic mask 1 and/or the server 3 through the second communication module. The second communication module includes a wireless or wired communication technology, for example, a Bluetooth technology, a WI-FI technology, a cellular network technology, a satellite communication technology and an optical fiber communication technology. In this embodiment, the electronic device 2 and the electronic mask 1 are interconnected by the Bluetooth technology, and the electronic device 2 and the server 3 are interconnected by the cellular network technology.

The electronic device 2 is installed with an application program, and interaction between the electronic device 2 and the electronic mask 1 and/or between the electronic device 2 and the server 3 is realized through the application program.

The working state of the electronic mask 1 is controlled by the application program. The working state includes: an image content displayed by the display screen 102, a display manner, a brightness of the display screen 102, on and off of the display screen 102, for example, switching of the displayed image, and a light-emitting state of the decorating part, for example, on and off, a flicker frequency, a color and a brightness.

The connection relationship between the electronic device 2 and the electronic mask 1 can be controlled by the application program, for example, the electronic device is optionally connected to or disconnected with one of the electronic masks 1.

Figure 7:
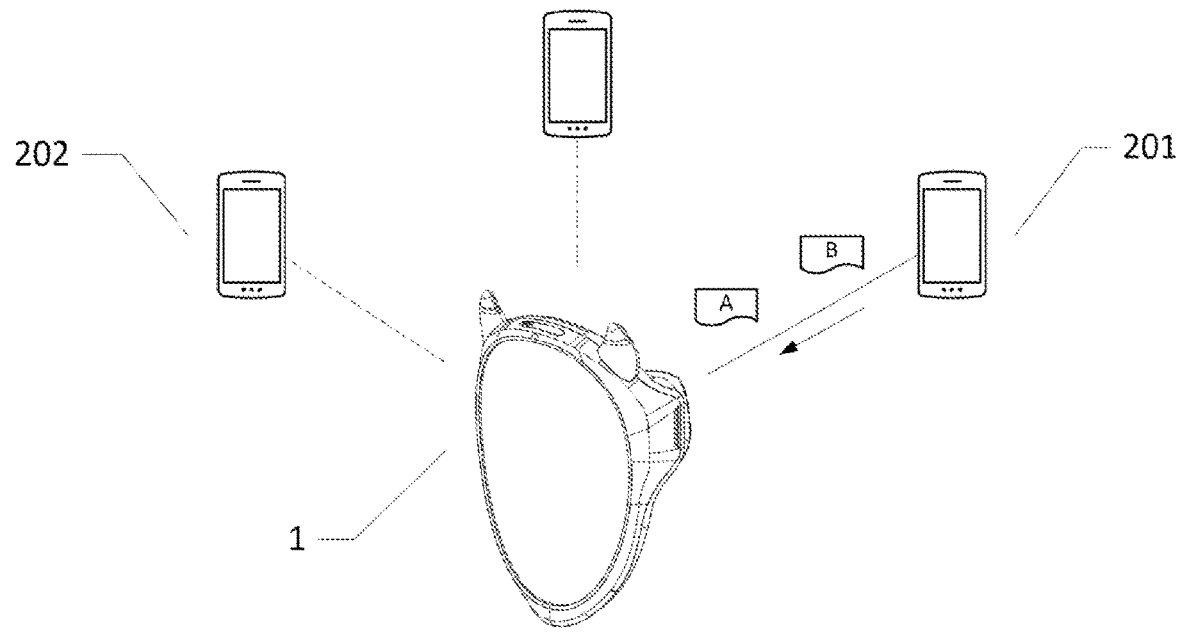
FIG. 7 is a schematic diagram of a state 1 of one of embodiments of a smart mask.
Figure 8:
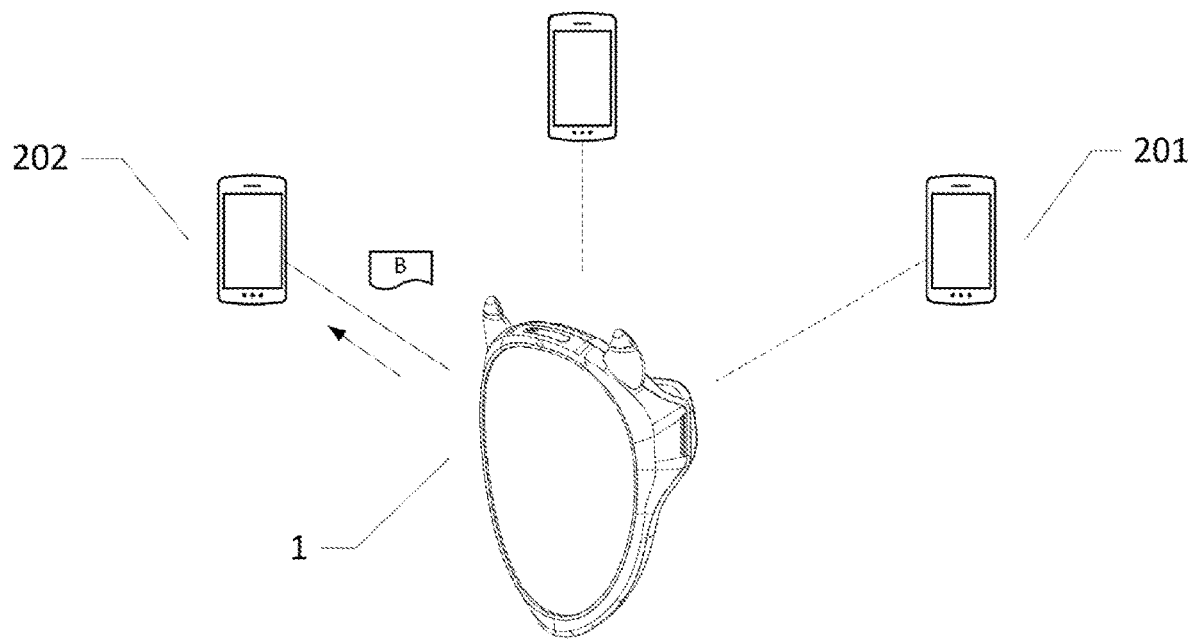
FIG. 8 is a schematic diagram of a state 2 of one of embodiments of a smart mask, Description of reference numerals: 1—electronic mask; 101—shell; 102—display screen; 103—panel; 104—circuit board; 105—rope-passing hole; 106—isolating pad; 107—corner lamp; 108—USB interface; 109—infrared gesture sensor; 110—rechargeable battery; 2—electronic device; 201—first electronic device; 202—second electronic device; 3—server.

In some embodiments, particularly in a case that the server 3 cannot be connected, after the same electronic mask 1 is connected to different electronic devices 2, and the electronic devices 2 can optionally download the image data stored in the storage module of the electronic mask 1 from the electronic mask 1. Data sharing of the electronic device 2 in a local area network can be realized by the electronic mask 1. For example, as shown in FIG. 7, after a first electronic device 201 is connected to the electronic mask 1, an image A and an image B are sent to the electronic mask 1, and the first electronic device 201 is disconnected with the electronic mask 1. As shown in FIG. 8, a second electronic device 202 is connected to the electronic mask 1, and the second electronic device 202 optionally downloads the image B on the electronic mask 1. At this time, the electronic mask 1 is equivalent to a sharing end of the image data.

Through the application program, image data of the server 3 can be browsed and/or managed, and the image data is downloaded optionally.

Through the application program, the image displayed by the electronic mask 1 can be edited, for example, the image to be displayed can be edited in a graffiti manner.

Through the application program, the Internet can be connected to, image data is searched and downloaded, and the image data is optionally sent to the electronic mask 1.

The electronic device 2 also can receive data sent by the electronic mask 1 and optionally display the data (information data) on the application program, or the application program makes a corresponding operation according to the data (instruction). For example, the information data includes: the electric quantity of the electronic mask 1, the storage capacity and content of the storage module and the working state of other parts of the electronic mask 1 can be displayed; and the instruction includes: responding to the instruction of updating the image of the electronic mask 1 and sending image data to be updated to the electronic mask 1.

The server 3 of the present application is configured to store data information capable of being displayed by the electronic mask 1 and respond to a request sent by the electronic device 2. For example, a browsing request of the electronic device 2 is responded, and information is fed back to the electronic device 2; a storage request of the electronic device 2 is responded, and the uploaded image data is stored in a database of the server 3; and a query request of the electronic device 2 is responded, and the server 3 queries the request content through the Internet and feeds the information back to the electronic device 2.

In some embodiments, the electronic device 2 browses an image resource in the server 3, and selects the image to download. The server 3 responds to the browsing request of the electronic device 2, loads the image information for the electronic mask 1 to display, and sends the image information to the electronic device 2. To improve the use experience, the server 3 performs sequencing according to the download frequency of the image information and sends the image information with higher frequency to the electronic device 2 first.

The foregoing is merely a preferred embodiment of the present disclosure and is not intended to limit the present disclosure. For those skilled in the art, the present disclosure may have various modifications and variations. Any modification, equivalent replacement, improvement and the like made within the spirit and principles of the present disclosure should be included in the scope of protection of the present disclosure.

What is claimed is:

1. A smart mask system, comprising:
    an electronic mask, configured to use an electronic display technology to display images;
    an electronic device, interconnected with the electronic mask and performing data interaction with the electronic mask; and
    a server, interconnected with the electronic device and performing data interaction with the electronic device,
    wherein the electronic device is installed with an application program, and interaction between the electronic device and the electronic mask or the server is realized through the application program;
    wherein the electronic mask comprises a display screen, a circuit board and a shell, the circuit board is arranged in the shell and is supported by the shell, and the shell is reserved with a window for the display screen to display images.

2. The smart mask system according to claim 1,
    wherein the electronic mask comprises:
    a drive circuit, electrically connected to the display screen, configured to drive a display area of the display screen, and comprising a processor, and a storage module, a first communication module and a power supply module which are electrically connected to the processor,
    the storage module being configured to store image data displayed by the display screen, and
    the first communication module being configured to establish a communication connection with the electronic device.

3. The smart mask system according to claim 2,
    wherein the display screen is arranged on a first surface of the circuit board, and the drive circuit is arranged on a second surface of the circuit board.

4. The smart mask system according to claim 2,
    wherein a decorating part with a light-emitting function is arranged on the shell, and is electrically connected to the processor.

5. The smart mask system according to claim 2,
    wherein the electronic mask further comprises a sensor module,
    the sensor module being electrically connected to the processor, and being configured to monitor an image and/or sound information outside the electronic mask and send the information to the processor to cause the electronic mask to make a corresponding response according to the information.

6. The smart mask system according to claim 2,
    wherein the electronic mask further comprises a button module, the button module being electrically connected to the processor.

7. The smart mask system according to claim 2,
    wherein the interaction between the electronic device and the electronic mask comprises:
    receiving, by the electronic mask, image data uploaded by the electronic device and storing the image data into the storage module in response to an image data uploading instruction sent by the electronic device.

8. The smart mask system according to claim 2,
wherein the interaction between the electronic device and the electronic mask comprises:
sending, by the electronic mask, the image data stored in the storage module to the electronic device in response to a download request instruction sent by the electronic device.

9. The smart mask system according to claim 1,
wherein a panel with light-transmitting property is arranged in the shell; and the panel is mounted on one side, for displaying images, of the display screen, and is configured to shield the display screen, such that a structure of the display screen is unable to be seen or seen clearly through the panel, and an intensity of light of the display screen passing through the panel is weakened.

10. The smart mask system according to claim 1,
wherein the shell is provided with a rope-passing hole for mounting a fastening rope, such that a user is able to fix the electronic mask on a head of the user through the fastening rope.

11. The smart mask system according to claim 1,
wherein an isolating pad is arranged on one side, close to a human face, of the shell; and the isolating pad allows for a certain distance between the face and the shell.

12. The smart mask system according to claim 1,
wherein the electronic device is provided with a second communication module, and achieves communication interconnection with the electronic mask and the server through the second communication module.

13. The smart mask system according to claim 1,
wherein the interaction between the electronic device and the electronic mask comprises:
executing, by the electronic mask, an operating state corresponding to a control instruction in response to the control instruction sent by the electronic device.

14. The smart mask system according to claim 1,
wherein the interaction between the electronic device and the electronic mask comprises:
receiving, by the electronic device, information data sent by the electronic mask, and displaying the information data by the application program.

15. The smart mask system according to claim 1,
wherein the interaction between the electronic device and the electronic mask comprises:
executing, by the electronic device, an operation corresponding to an instruction in response to the instruction sent by the electronic mask.

16. The smart mask system according to claim 1,
wherein through the application program, image data of the server is capable of being browsed and/or managed, and the image data is downloaded optionally; or
through the application program, the Internet is capable of being connected to, and image data is searched and downloaded; or
through the application program, an image content displayed by the electronic mask is edited.

17. The smart mask system according to claim 1,
wherein the server is configured to store image data capable of being displayed by the electronic mask and respond to a request sent by the electronic device.

18. The smart mask system according to claim 17,
wherein the server, in response to a browsing request of the electronic device, loads image information displayed by the electronic mask, and sends the image information to the electronic device,
the image information being sequenced according to download frequencies of the image information, and image information with higher download frequencies in the sequenced image information being sent to the electronic device.

* * * * *